United States Patent

Milton

[15] 3,647,237
[45] Mar. 7, 1972

[54] SNOWMOBILE DOLLIES

[72] Inventor: Floyd W. Milton, Route 2, Box 197, Grand Rapids, Minn. 55744

[22] Filed: Nov. 6, 1968

[21] Appl. No.: 773,777

[52] U.S. Cl. ............................ 280/47.24, 214/390, 254/8 R
[51] Int. Cl. ........................................................ B62b 1/26
[58] Field of Search ................ 280/47.24, 46; 214/370, 384, 214/390; 254/8 R

[56] References Cited

UNITED STATES PATENTS

| | | | |
|---|---|---|---|
| 1,346,712 | 7/1920 | Kimmerle | 214/384 |
| 2,551,097 | 5/1951 | Cole | 254/8 X |
| 2,010,490 | 8/1935 | Jones | 254/8 |
| 3,015,494 | 1/1962 | Fosbrook | 280/46 X |

*Primary Examiner*—Leo Friaglia
*Assistant Examiner*—John A. Pekar

[57] ABSTRACT

A front and rear dolly over which the front and rear end of a snowmobile can be placed so that the snowmobile may be transported conveniently to a place of use, each dolly including a frame supported upon a pair of wheels, each frame being adapted for receiving the snowmobile, and each dolly including a handle.

1 Claims, 4 Drawing Figures

PATENTED MAR 7 1972
3,647,237
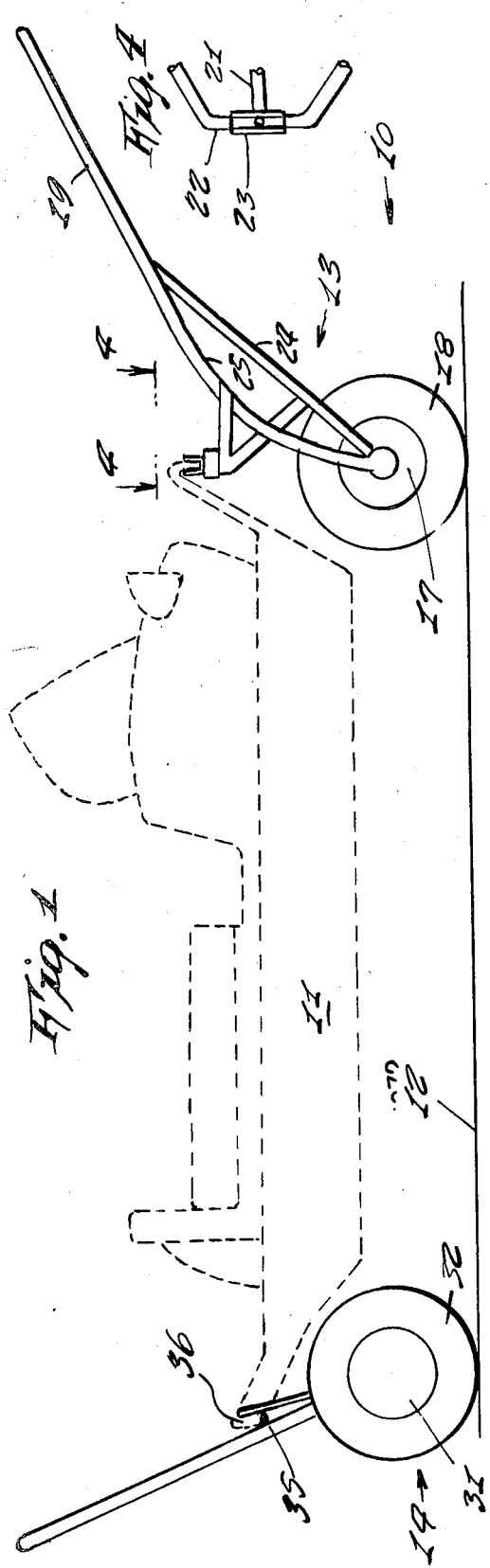
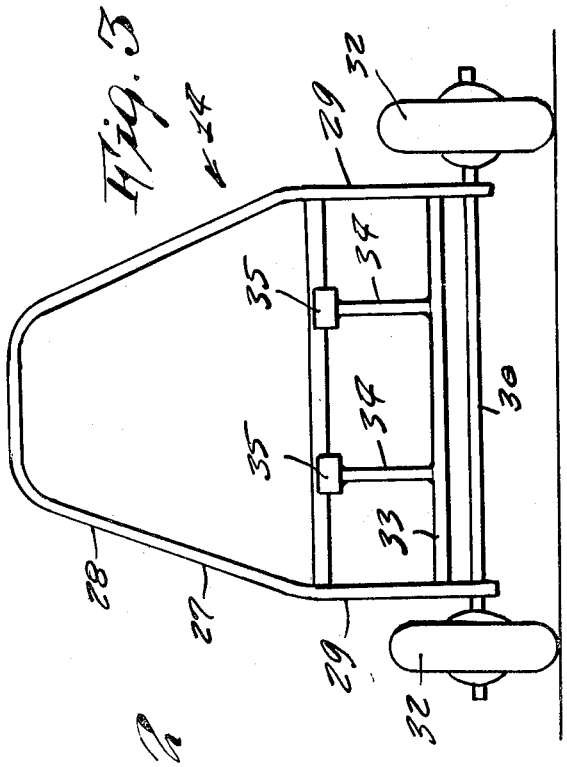
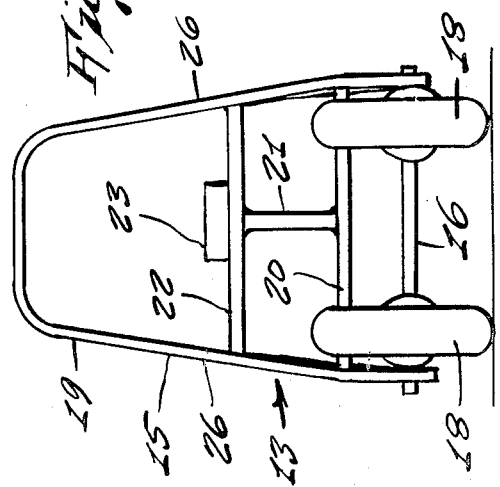
INVENTOR
FLOYD W. MILTON

SNOWMOBILE DOLLIES

This invention relates generally to transportation dollies. A principal object of the present invention is to provide a pair of dollies designed specifically for the transportation of a snowmobile across an area which lacks snow.

Another object of the present invention is to provide a pair of snowmobile dollies which are accordingly practical for use to transport a snowmobile out of a garage and over a dry floor, thus eliminating the necessity of forcing it on its own power to move thereacross and thereby cause excessive wear on the tracks and skags under the runners. Such practice is fraught with the danger of running into something and thus damaging the snowmobile.

Yet another object of the present invention is to provide a pair of snowmobile dollies having self contained means for easily being fitted under the respective end of the snowmobile and raising the same for purpose of transporting the same.

Other objects of the present invention are to provide a pair of snowmobile dollies which are simple in design, inexpensive to manufacture, rugged in construction, easy to use and efficient in operation.

These and other objects will be readily evident upon a study of the following specification and the accompanying drawing wherein:

FIG. 1 is a side elevation view of the front and rear dollies shown in operative use transporting a snowmobile;

FIG. 2 is a front elevation view of the front dolly;

FIG. 3 is a front elevation view of the rear dolly; and

FIG. 4 is a fragmentary top plan view of the front dolly as viewed along line 4—4 of FIG. 1.

Referring now to the drawing in detail, the reference numeral 10 represents a pair of dollies used for the purpose of transportation of a snowmobile 11 in an elevated position over a dry floor or land 12.

The pair of dollies include a front dolly 13 and a rear dolly 14.

The front dolly is comprised of a frame 15 which includes an axle 16 supported upon a pair of spaced apart wheels 17 having rubber tires 18. The frame 15 includes a generally U-shaped handle 19 having a cross brace 20 rigidly affixed transversely thereacross, an upstanding brace 21 between cross brace 20 and a pivot block support 22 upon which there is mounted a pivot block 23 with integral bumper hook and stud. A brace 24 extends across an arcuate portion 25 of each leg 26 of the handle 19 so to provide rigidity thereto.

The rear dolly 14 includes a frame 27 comprised of a generally U-shaped handle 28 comprised of opposite legs 29, lower ends of the legs 29 supporting a transverse axle 30 upon which there are mounted a pair of wheels 31 each of which is provided with a pneumatic rubber tire 32 that is similar to the tire 18 of the front dolly. A cross brace 33 between the legs 29 of the handle 28 provides a support for upstanding braces 34 each of which carries a support 35 for a hook and upon which the rear end of the snowmobile 11 is supported. The hook comprises a bracket hook 36 as shown in FIG. 1 of the drawing.

It is to be noted that the rear dolly 14 is of generally wider construction than the front dolly, and it is to be further noted that the front dolly handle 19 extends in a more horizontal direction for the purpose of pulling.

In operative use, each of the dollies is pivoted by means of leverage against the handle thereof so as to raise an associate end of the snowmobile upwardly, thus eliminating excessive effort for raising the same, and the dollies in position thus permit moving the snowmobile across an area lacking snow to a place of use.

When not in use, the rear dolly may be set on the front dolly and rolled as a single unit to a wall and hung thereupon as a single unit in an out of the way position, thus requiring no floor space. The frame should preferably comprise a rigid member wherein the elements thereof are welded together. The specific support on each dolly may be designed to suit a particular make of snowmobile.

While various changes may be made in the detailed construction, it is understood that such changes will be within the spirit and scope of the present invention as is defined by the appended claims.

I claim:

1. As means for raising a snowmobile from floor level, the combination of a front dolly and a rear dolly, each said dolly including an open frame constituting a generally U-shaped handle embodying side legs with a cross connection at their outer ends, an axle on which the lower ends of said legs are mounted, a pair of wheels on said axle and rubber tires on said wheels, the framing of said front dolly includes a cross brace above said axle, a vertical brace extending upwardly from such cross brace, a pivot block support on said vertical brace, and a pivot block on such support and including a bumper hook and stud, the side legs of the said handle of the front dolly including a longitudinally extending arcuate inner portion and an underlying brace integral therewith, the framing of said rear dolly including a cross brace between the side legs of its respective handle, a plurality of upstanding braces integral with such cross brace, the opening between the said side legs of the front dolly being of less width than the corresponding opening in the rear dolly, and a hook attached to each of said braces and upon which the rear end of a snowmobile is detachably suspended.

* * * * *